7 Sheets—Sheet 3.

C. M. RICHARDSON, J. S. GIBBS & J. H. MACY.
Paper-Bag Machine.

No. 217,639. Patented July 15, 1879.

7 Sheets—Sheet 6.

C. M. RICHARDSON, J. S. GIBBS & J. H. MACY.
Paper-Bag Machine.

No. 217,639.      Patented July 15, 1879.

Witnesses                                  Inventors

7 Sheets—Sheet 7.
C. M. RICHARDSON, J. S. GIBBS & J. H. MACY.
Paper-Bag Machine.
No. 217,639. Patented July 15, 1879.
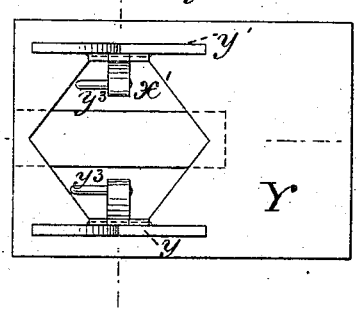
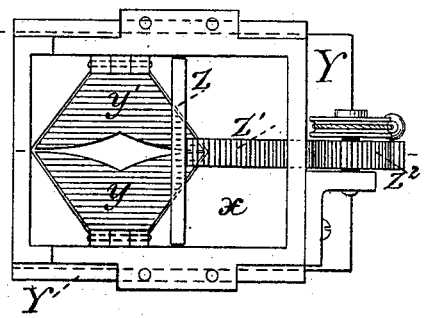
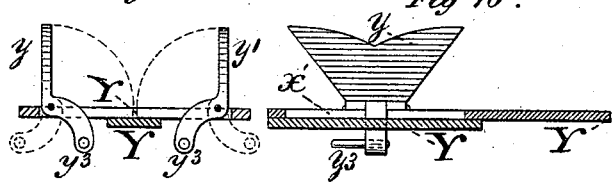
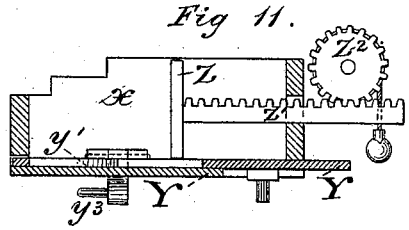
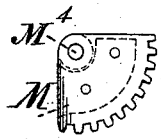
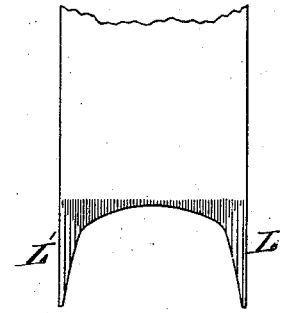
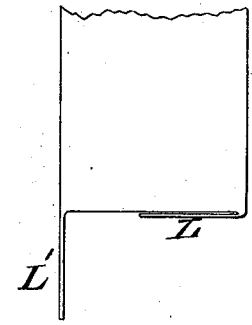
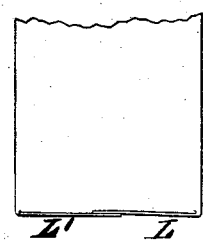
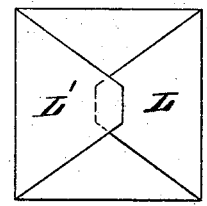
Witnesses
John S. Trottenshee
Robert J. Stuart
Inventors
Charles M. Richardson
Jacob S. Gibbs
Josiah H. Macy

UNITED STATES PATENT OFFICE.

CHARLES M. RICHARDSON AND JACOB S. GIBBS, OF BRIDGEPORT, CONN., AND JOSIAH H. MACY, OF HARRISON, NEW YORK, ASSIGNORS, BY MESNE ASSIGNMENT, TO LYDIA H. AUSTIN, OF BOSTON, MASS.

IMPROVEMENT IN PAPER-BAG MACHINES.

Specification forming part of Letters Patent No. 217,639, dated July 15, 1879; application filed July 24, 1878.

*To all whom it may concern:*

Be it known that we, CHARLES M. RICHARDSON and JACOB S. GIBBS, both of Bridgeport, county of Fairfield, State of Connecticut, and JOSIAH H. MACY, of Harrison, county of Westchester, State of New York, have invented a new and useful Improvement in Machines for Making Satchel-Bottom Paper Bags, which is fully set forth in the following specification and accompanying drawings, in which—

Figure 1:
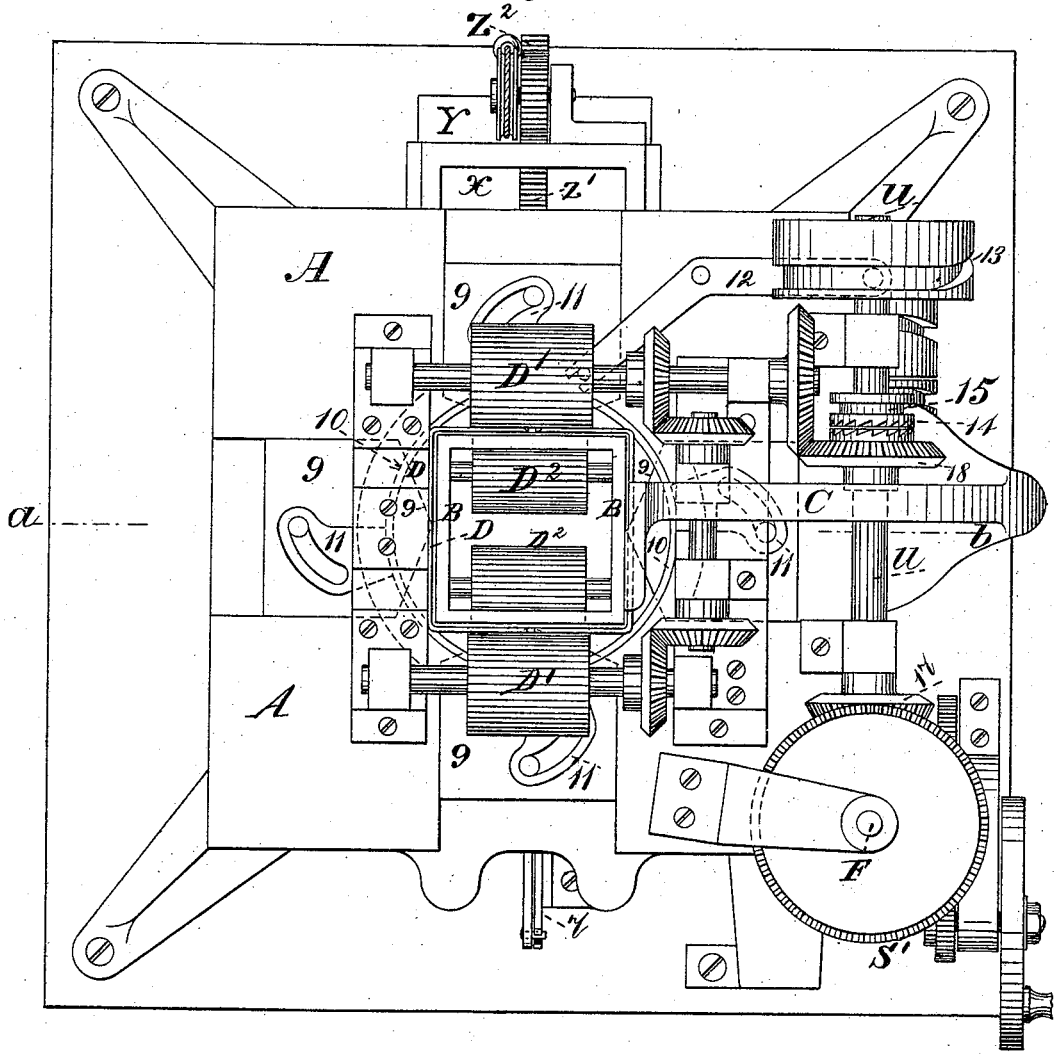
Figure 2:
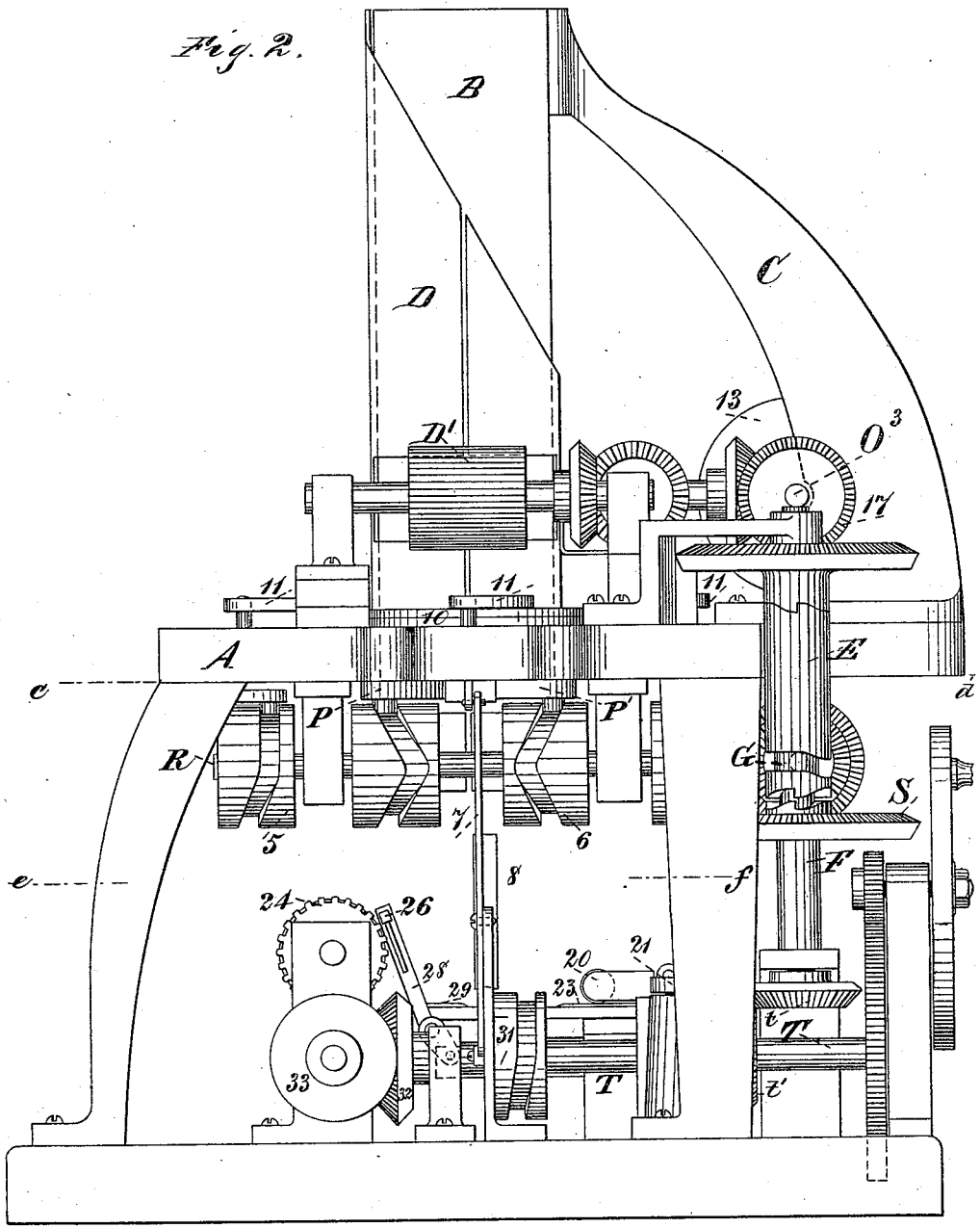
Figure 3:
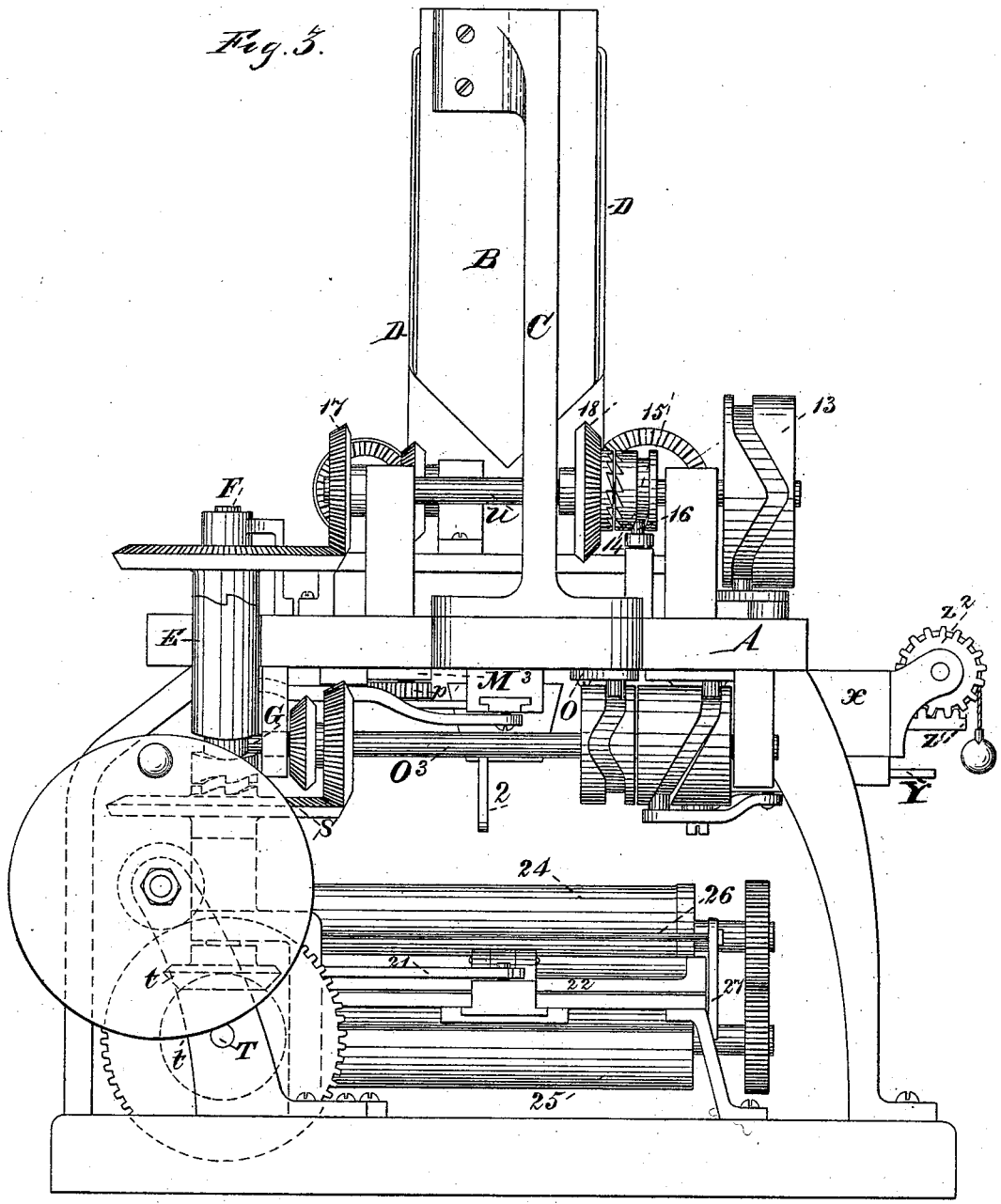
Figure 4:
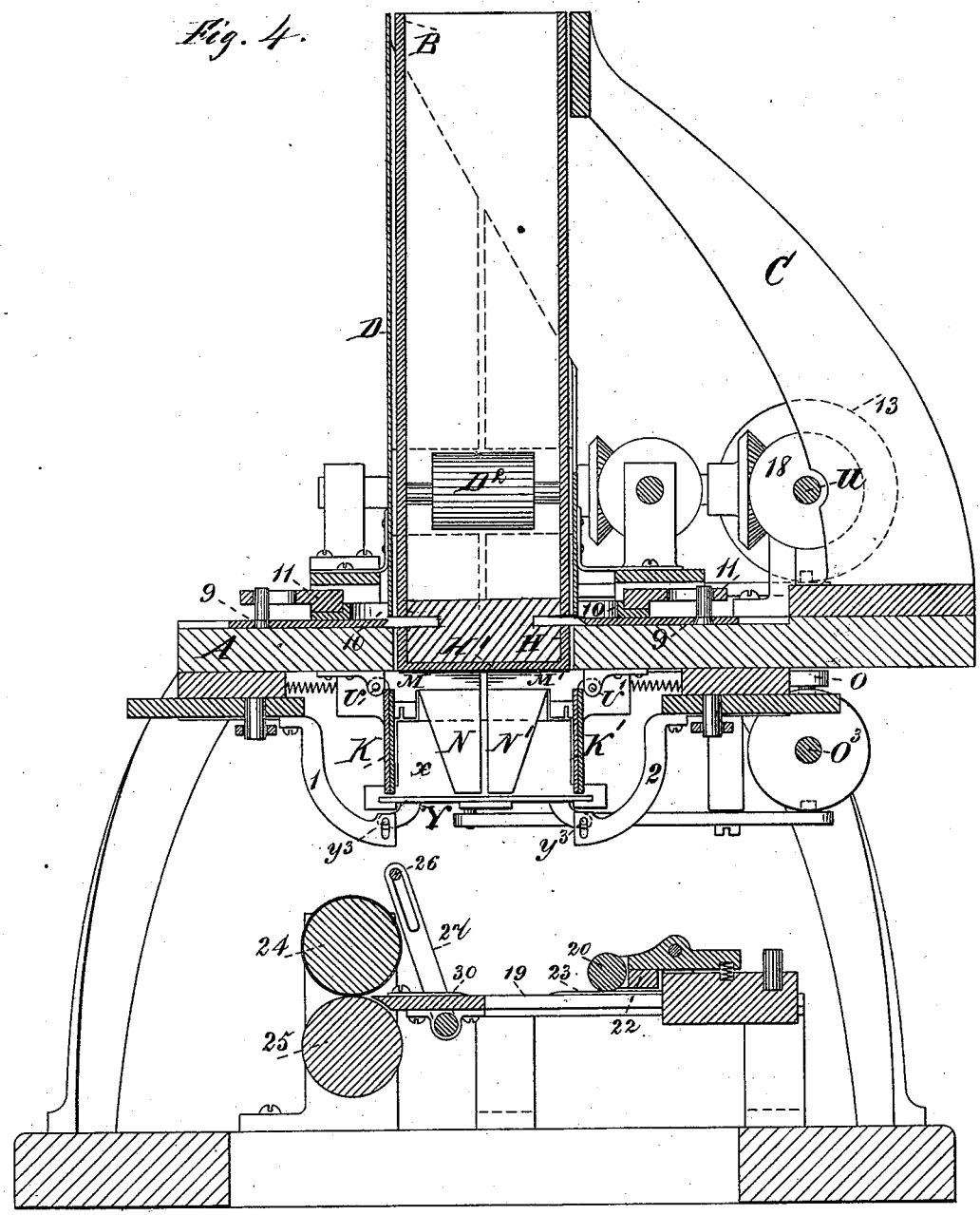
Figure 5:
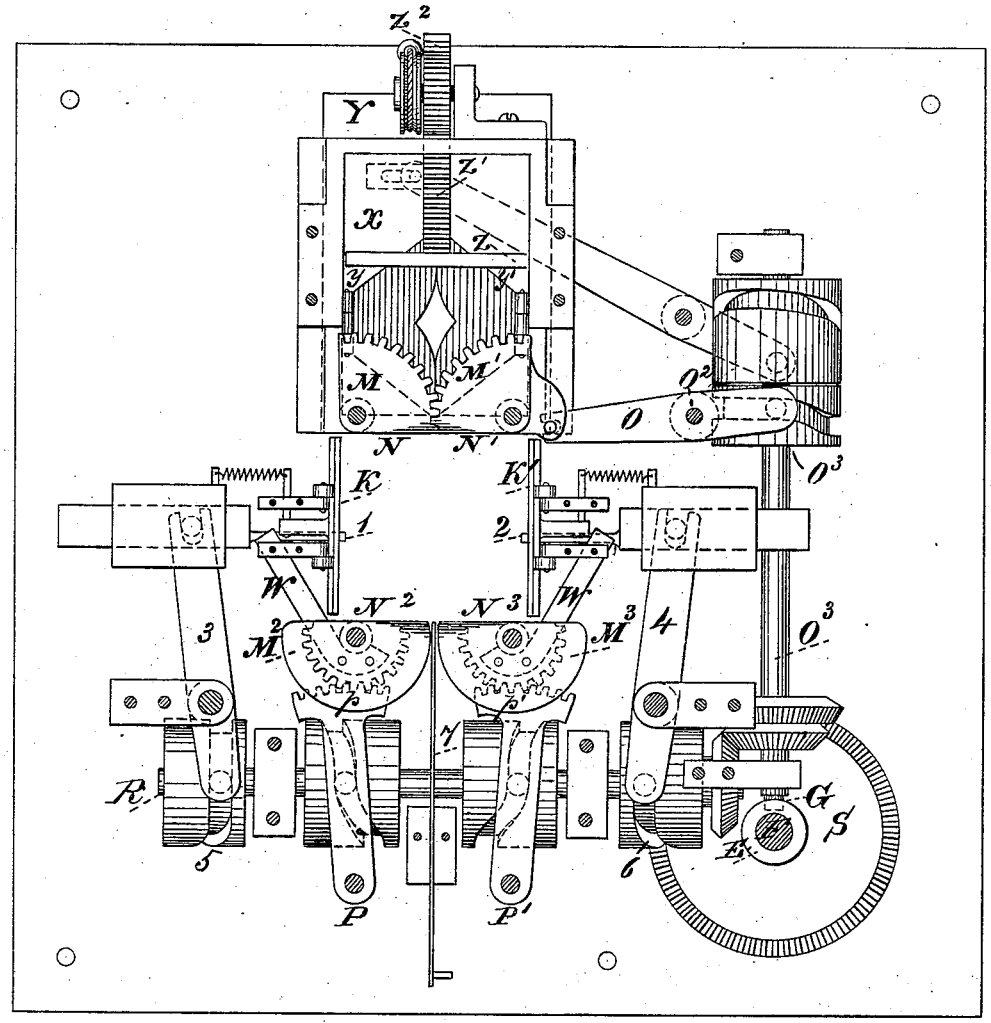
Figure 6:
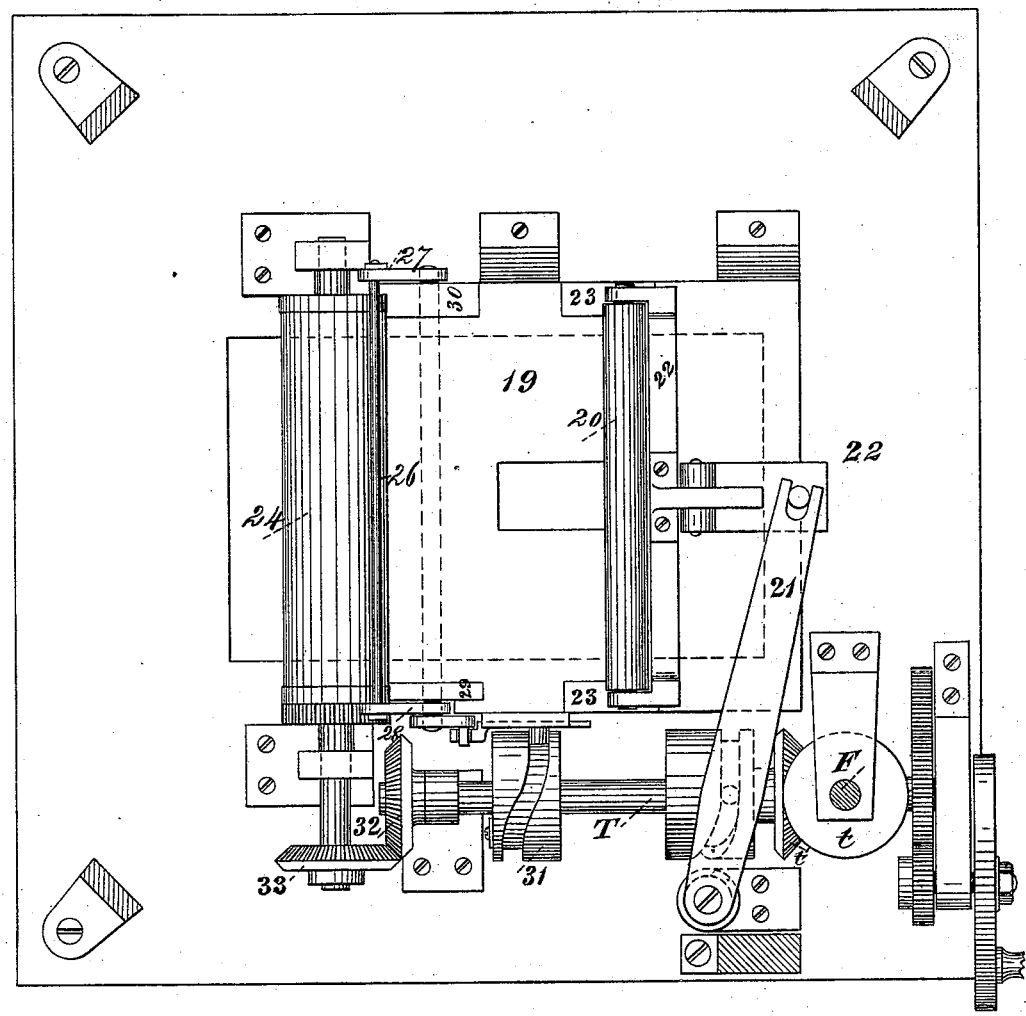

Figure 1, Sheet 1, represents a plan or a top view of the machine as it is at present constructed. Fig. 2, Sheet 2, represents a side elevation of the machine, showing the tube-forming mechanism in elevation, and also the various cams for moving the cutting-off and folding mechanism. Fig. 3, Sheet 3, represents a side elevation of the machine at a right angle to that shown at Fig. 2. Fig. 4, Sheet 4, represents a vertical section of the machine through *a b*, Fig. 1, Sheet 1, or taken from the same position as represented in Fig. 2. Fig. 5, Sheet 5, represents a horizontal section of the machine, taken through *c d*, Fig. 2, or below the cutting apparatus. Fig. 6, Sheet 6, represents the mechanism of the machine through *e f*, Sheet 2, or below the folding apparatus, and a plan of the devices for folding the bag when completed and ready for the market. The various figures from 7 to 16 on Sheet 7 represent detail views of the various devices used in forming the bottom of the bag, and also diagrams representing the portion of the various folds of the paper in the formation of the rectangular bottom on the bag.

This invention pertains to the manufacture of what is termed in the art "satchel-bottom paper bags;" and the invention consists in the combination of various mechanical devices by which the paper is taken from a roll or continuous sheet and fed directly to the operating mechanism in such a manner that a rectangular tube is formed, from which the sacks or bags are afterward made and folded ready for transportation; or, to be more specific—

The invention consists, first, in the combination of a rectangular jacket with a rectangular former, in such a manner that a rectangular tube of paper is formed from a continuous roll or sheet, and before it is separated into proper lengths for a bag has its lower end folded and pasted, as will hereinafter appear.

Second, the invention also consists in the combination of peculiar folding devices with the tube-former and its jacket, by which the bottom of the bag is formed in a manner resembling bags formed by hand, but with broad points on the bottom.

Third, the invention also consists in the combination of certain pasting devices operating in conjunction with the folders and tube-former, so that a rectangular-bottom bag is formed with a peculiar kind of fold on the bottom, as will hereinafter appear.

Fourth, the invention also consists in the combination of peculiar cut-off devices with the said former, by which, after the bottom is folded and pasted on the end of the paper tube, the required length of the tube to form a bag is cut off, as will hereinafter appear.

Fifth, the invention also consists in certain folding devices, by which the rectangular bag is flattened and folded into proper shape to be packed into bundles or packages ready for shipment, as will hereinafter appear.

Sixth, there are also certain peculiar combinations of mechanism for operating the several parts of the machine, which will form the subject of special claims, as will hereinafter appear.

Seventh, the invention also consists in the peculiar manner of forming the bottom of the bag, whereby a new article of manufacture is produced.

At A is represented the bed-plate of the machine, which is mounted upon feet or suitable supports, as represented.

At B is shown the rectangular guide or former, around which the paper is conducted to form a rectangular tube, from which the bags are made. Said rectangular tube is formed of metal, and is suspended at its upper end upon a bracket, as at C, which is supported upon the bed-plate of the machine, as represented in Figs. 2, 3, and 4 of Sheets 2, 3, and 4 of the drawings.

The said rectangular tube is surrounded by a jacket or tube, D, of the same shape, made of sheet metal, between which and the tube B or the former there is a space for the sheet of paper to travel, and the said sheet of paper is carried from suitable supports placed above the machine downward in a vertical direction and around the said tube-former B, in such a manner that a rectangular tube is formed of the paper while it is being drawn down and around the said tube by the feeding-rolls, (shown at $D^1$ and $D^2$,) the first being placed upon the exterior portion of the tube or former, and the second on the interior, as represented in the plan shown at Fig. 1, Sheet 1.

The said exterior jacket, D, is supported at its lower end upon the bed-plate of the machine, and its upper end is formed upon the opposite sides in an acute angle relatively to the bracket which supports the rectangular tube around which the paper is folded, the object of said acute angle being to guide the paper in its descent around the tube-forming device in such a manner as to draw it tightly around the same and backward toward where the seam of the tube is made, or to a point immediately under the bracket C. In other words, this angular shape of the jacket serves to draw the paper backward toward its vertical seam, so that as the paper tube is caused to descend toward the mechanism where the bottom is made it will be drawn tightly around the suspended tube-former, and thereby make the paper tube always of the same size.

The feed-rolls for drawing down the said paper tube, as represented at $D^1 D^2$, must be intermittent in their action, or, in other words, operating so as to allow the paper tube to remain at rest until the bottom is folded and pasted upon the lower end, so as to form the completed bottom of the bag; therefore there is provided in the operating mechanism a peculiar kind of shifting or resting device for the feed-rolls, which alternately connects with the driving-shaft of the machine and with the shaft which operates the said feed-rolls.

This peculiar shifting device is represented at E in the drawings, and consists of a sleeve sliding upon a vertical shaft, F, said sleeve being provided with clutches at its opposite ends, the said clutches connecting alternately with the said feed-rolls and the cutting and folding devices. This alternate movement of the clutch-sleeve is produced by a pin working in a groove on its exterior, as shown at G, and which is for the express purpose of transferring the said clutch E from the driving mechanism of the folders and cutters to that which operates the feed-rolls, and vice versa.

The rectangular and suspended tube-former extends down through the bed-plate of the machine, as shown at H, so that its lower end may serve as a support for the several sides of the paper tube to be folded in upon it. It also supports a rectangular plate, H', a section of which is shown in Fig. 4, against which the folding mechanism operates to form the bottom of the bag. The outer edge of the under side of said plate is nearly even or corresponds with the lower end of the former B vertically; and said plate is provided with an elastic cushion, such as soft rubber or some similar elastic material, on its under side, and upon which the bottom of the bag is folded and pasted. In other words, the under side of said plate is cushioned, to serve as an elastic bed, upon which the folding devices co-operate in forming the bottom of the bag.

In order that the opposite sides of the said rectangular tube of paper may be folded in toward the center of the tube, so as to receive the proper amount of paste for attaching and holding the several parts together, there are provided lateral supports $k$ $k'$ in the folding mechanism, best seen in Fig. 4, where said supports or folders are represented in a vertical position and in proper position to compress the edges of the opposite V-shaped points formed by making the first two folds, thus preparing said points by breaking or compressing the fiber of the paper for the pasting leaves or plates $y^1$ to press in proper form upon the inner side of the tube, as will be hereinafter explained.

The diagrams at 13, 14, 15, and 16 of the drawings represent the portion of the several sides of the tube of paper during the operation of having the bottom folded thereon, the one at Fig. 13 representing the portion of the lower end of the tube while the vertical supports are in the position shown in Fig. 4, and during the time that the two opposite folders are pressing in the opposite sides of the paper tube.

At diagram 14 is represented the position of the lower portions of the paper tube when the said pasting-plates have been withdrawn, and one of the sides, as at L, thus formed is folded toward the center.

Fig. 15 represents the opposite side, L, as folded in toward the center in a similar manner; and Fig. 16 shows the plan or outlines of the bottom when finished.

It is evident that these folding devices may act in succession, if desired, or so that the succeeding folds may be pasted as they are formed upon the V-shaped points. This result is accomplished by having each folding device operated by its appropriate cam or cam-grooves, best seen in Fig. 5, where M, $M^1$, $M^2$, and $M^3$ represent segment-shaped folders pivoted on the under side of the bed-plate of the machine, as at $M^4$. (See detail views at Fig. 12, Sheet 7.) Said segments are provided with vertical V-shaped plates, (shown at N $N^1$ in Fig. 4,) which sweep around with the segments M $M^1$, &c., to compress the paper in forming the first folds on the lower end of the tube. One pair of said segments, as at M $M^1$, operate first, and coact together to form the first fold on that side of the paper tube. Their outer edges are formed with teeth, gearing into each other, and one of them, as at $M^1$, is provided with a projection at one corner to connect with a lever, O, pivoted to the bed-plate at $O^2$, and the other end of the lever has a pin working in a cam-groove on the shaft $O^3$, from which it will be seen that as said shaft revolves the two segments will sweep inward and underneath the bottom of the rectangular former, and thereby press inward the side of the paper tube, their upper surfaces sweeping or rubbing the paper across and over the sharp edges of the bottom plate H' on the former, and so creasing the paper that the pasting-plates can follow in the same space after the folders are returned to their first position.

The other pair of segment-folders, $M^2$ and $M^3$, on the opposite side, operate in the same way to fold the opposite side, and thus leave the lower end of the tube in the position shown at Fig. 13 of Sheet 7. This pair of folders is operated by the levers P P', with rack-teeth on one end gearing into segments at $p\ p'$, and the levers have pins working in grooves on the cam-shaft R, which is driven by bevel-gears connecting it to the shaft $O^3$, said shaft receiving motion from the wheel S, which is operated intermittingly by the vertical clutch-sleeve E on the shaft F, which receives motion from the shaft T through the bevel-wheels $t\ t'$, one of which is on the shaft T, that is driven from any prime motor, as a belt, gear, or crank. (See Fig. 6.)

The segment-folders in their sweep press the paper over the bottom H' in a quadrant shape, and also back against the two vertical folders, as at K K', that are hinged on the under side of the bed-plate, as at U U', and are caused to rise or fold up like two doors by the levers W W, which are fastened upon the segments $M^2\ M^3$, and move to close the folders up against the bottom on the return of the segments to their first position.

The inner faces of these folders K K' are covered with some elastic substance, as rubber, to serve as a cushion to compress the folded bottom of the bag between them and the cushioned bottom H' at the lower end of the former.

Before these last folds are made the paste is applied in the following manner: A paste-box, as at X, is attached upon the under side of the machine, detailed views of which are seen at Figs. 7, 8, 9, 10, and 11; and underneath said box there is a slide, as at Y, that carries the pasting-plates $y\ y^1$, which are pivoted to said slide, which, with the plates, form a sliding bottom to the paste-box X, which has a large rectangular hole in its bottom, as at X', to permit the paste to press upon the faces of the paste-plates as they slide under the box or paste-receptacle.

There is a follower in the outer end of the paste-box, as at Z, that is kept constantly pressed forward by a rack, pinion, and weight, as at $Z^1$ and $Z^2$, for the purpose of pressing the paste forward to the opening X' in the bottom of the box.

The paste-plates $y\ y^1$ are pivoted to the sliding bottom and fit into a recess in it. They are wing-shaped, as shown in Sheet 7, Figs. 8 and 10, or in the proper shape to apply the paste in the form required to fasten the V-shaped portions of the bottom of the bag when folded together. There is an arm attached to each plate $y\ y^1$, extending down through the slide, and to each arm there is a pin, as at $y^3$, which, as the sliding bottom is forced under the bottom of the bag, said pins $y^3$ extend into the holes in the operating-arms 1 and 2, which are caused to slide to and fro by cam-levers 3 and 4, which are shifted by the cams 5 and 6 on the shaft R, and thus when the pasting-plates have been advanced under the center of the bottom they are caused to rise from their recess in the slide-bottom that carries them and open up and out and press the paste upon the inner faces of the downwardly-projecting points of the bag, as seen at Fig. 13, and thereby smear the paste upon their inner faces prior to their being folded. Here it may be remembered that said points, as shown in Fig. 13, are represented as not being pressed very closely upon the outside fold of the bag, as is shown by the shading-lines in the drawings. These places are left open purposely to permit the paste to pass in against the outer portion of the paper, and so there will not be two thicknesses of paper between the pasted surface and the last fold. This result is produced by rounding the upper corners of the segment-folders, as shown in Figs. 5 and 12, so that the paper is not folded closely at the angle next the bottom, and thus the lower ends are not drawn to a sharp point, but left, as shown at Fig. 16, with a space of some width to receive the paste on its inner face and thus firmly close the bottom.

The result of this peculiar kind of folding operation is to produce a bag in which the first and second folds overlap each other, and at the same time furnish a broad point on the two opposite sides for the paste to be relaid on the outer thickness of the paper, so that the bottom is more firmly closed than has heretofore been done in the manufacture of such bags.

To prevent the pasting-plates from drawing the bottom out of shape when they leave the paste on the inner faces of the said parts, there is provided a small holding-rod, as at 7, Figs. 2 and 5, which is connected to a lever, and is operated by a cam on the shaft T, and is reversed by a spring, as at 8. This rod is slipped in between the folders $M^2$ and $M^3$, and presses against the second fold of the bottom, where the edge overlies the first, and thereby holds the center of the bottom in proper position until the parts are nearly folded in place, when it is withdrawn.

The cutters are shown at 9, and are simply V-shaped plates that are forced inward through the sides of the paper tube just above the plate H', or between it and the lower end of the tube B. They are all operated simultaneously by being connected to a circular plate, (shown in plan in Fig. 1 at 10,) said plate having tangent-shaped grooves at four points on its circumference, as at 11, into which pins from the cutter-plates project, so that as the ring is partially rotated the cutters are forced in and out very quickly, the said ring being operated by a forked lever at 12, Plate 1, pivoted to the bed-plate, and having a pin in one end, working in a grooved cam at 13 on the shaft U. It will be observed that this shaft has an intermittent motion, to permit the feed-rolls to rest, as already mentioned; and in addition thereto there is also a second rest required for the cutters, as they operate when the feed-rolls and the paper are at rest. Therefore there is provided a sleeve-clutch, 14, on the shaft U, which has a cam-groove on its exterior, as at 15, that engages with a fixed pin at 16 on the frame, which has the effect to throw the clutch in and out of gear with the wheels that drive the feed-rolls, as shown at 17 and 18, which are bevel-wheels, giving motion to the feed-rolls.

Both of the sleeve-clutches, as at E and 14, are provided with splines on their shafts, so that they revolve with the shafts, but are shifted endwise by the fixed pins working in their cam-grooves.

Beneath the machine, as now described, there are arranged the devices for folding the finished bags as they descend from the cutters. This mechanism consists of a bed, as at 19, upon which the folding devices are mounted, and upon which the bottom of the bag rests after it is cut off from the paper tube. While the bag is standing in a rectangular form on the said bed a small roller, as at 20, is shoved forward by the forked lever 21, operated by a cam on the shaft T, the other end of the lever 21 being attached to the roll-carriage, as at 22. Said roll-carriage slides on two strips, as at 23, which hold the roll up from the bed to prevent it from rolling in on the bottom of the bag until it has forced the bag over toward the finishing-rolls at 24 and 25. Said bearing-strips are to be set at the proper distance back from the finishing-rolls to just permit the small roller at 20 to act first as a sliding or adjusting device, and then as a roller, to begin rolling down the bottom at one side or edge. As soon as the said roller has commenced to roll down the back edge of the bottom, a rod, as at 26, which is attached to vibrating arms 27 and 28, is caused to move back quickly against the bag, and flattens it back upon or over the roller at 20, (see Fig. 6,) and as soon as the roller 20 has advanced to the center of the bottom, or nearly so, its frame rises upon two other bearing-plates, 29 and 30, near the finishing-rolls, which lift the roller 20 and stop its rolling action, but which allow it to again serve as a shoving device to force the other edge of the bottom in between the finishing-rolls, where the bag is caught or drawn out of the machine flattened and ready for packing.

The flattening-rod 26 is worked by a cam-wheel at 31 on the shaft T, similar to the fly on a printing-press, and the finishing-rolls are operated by gearing connected with the driving-shaft T, as at 32 and 33.

As the paper comes to the machine from a roll suspended at some distance above, or by passing over suitable guides for the purpose, its edges pass by the bracket C, that supports the tube-former B, and the said edges must be lapped over upon one another and pasted in some suitable manner, as by a pasting-wheel, applying paste underneath the bracket in any of the well-known methods of forming paper tubes for such purposes, and the said seam must be formed on the side of the tube-former next to the bracket C. Consequently the upper end of the bracket is set over to one side, as shown at Fig. 3, to permit the required lapping of one edge over the other.

It is evident that the inclined upper end of the jacket D may be provided with bars or rollers made adjustable to vary the said angle, and thereby vary the amount of tension on the paper.

The lower folding devices may also be placed on the floor instead of a bed-plate, as represented in the drawings.

It will also be evident that many other variations may be made in various portions of the mechanism without departing from the nature of our invention.

We therefore claim—

1. In a machine for making rectangular satchel-bottom bags, the combination of the jacket D, having an inclined end, with the rectangular tube-former B, substantially as described.

2. In combination with a rectangular tube-former, the folding devices, substantially as shown and described, which sweep in the arc of a circle from the center of the sides of the tube toward the intermediate sides, as and for the purposes set forth.

3. In combination with the tube-former, as described, and folding devices that sweep over the bottom to the four corners, the folders K K', for completing the folding operation, as described.

4. In combination with the folders M, M¹, M², and M³, the vertical compression-plates N, N¹, N², and N³, to assist in forming the bottom fold, substantially as set forth.

5. In combination with the tube-former B, the supporting-plate H', provided with an elastic or cushioned face, for supporting the inner portions of the bottom during the folding operation, substantially as set forth.

6. In combination with the tube-former and supporting-plate H', the V-shaped cutting-plates, which project into the space between the plate H' and the rectangular tube B, substantially as described.

7. In combination with the vertical tube-former B and folding-plates K K', the pasting-plates $y$ $y^1$, as and for the purposes described.

8. The combination of the paste-box X, the follower Z, sliding bottom, and pasting-plates, substantially as described.

9. The combination of the clutches E and 14 on their respective shafts and the intermediate gearing with the feed-rolls and cutters, substantially as described.

10. The combination of the vertical clutch-sleeve E, shaft F, wheel S, cam-groove G, shaft O³, and shaft for giving motion to the pasting devices, substantially as described.

11. In combination with the bag-forming mechanism hereinbefore described, the table 19 and the adjusting and folding roll 20, substantially as set forth.

12. In combination with the finishing-rolls 24 and 25, the roll 20, which acts both as an adjusting device and a roll, substantially as described.

13. The combination of the roll 20, the rod 26, and the bearing-strips 23 on the bed or table 19, substantially as described, and for the purposes set forth.

CHARLES M. RICHARDSON.
JACOB S. GIBBS.
JOSIAH H. MACY.

Witnesses:
JOHN S. FOLLANSBEE,
ROBERT G. STUART.